(No Model.)
J. W. FISKE.
CHUTE FOR FEED MANGERS.
No. 351,505. Patented Oct. 26, 1886.
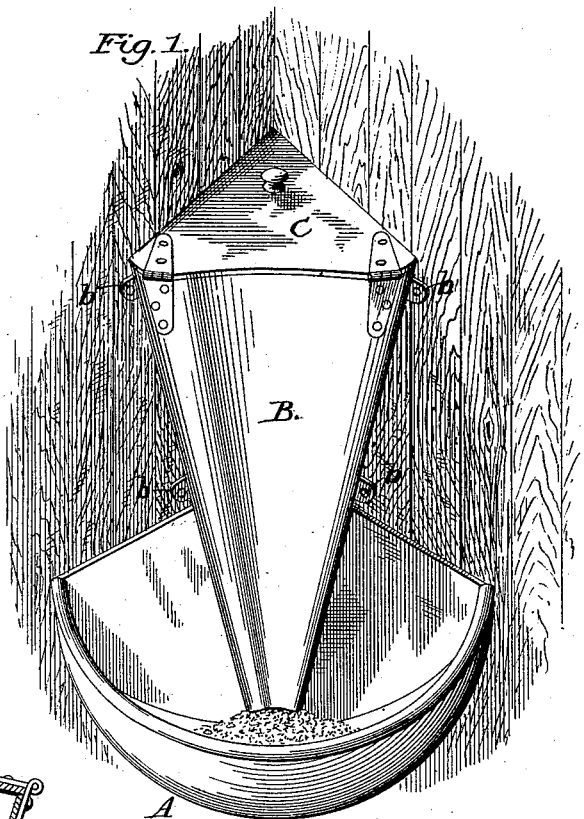
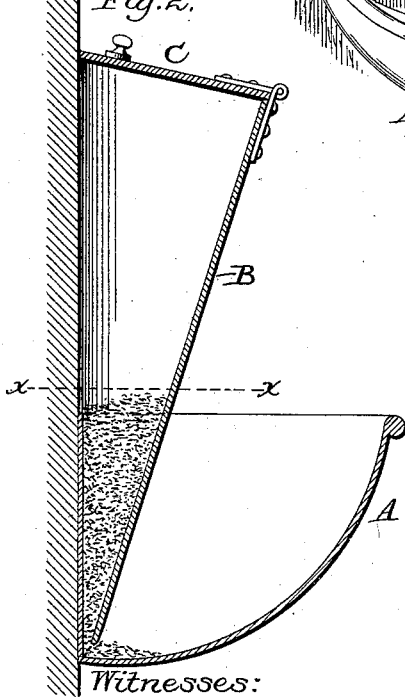
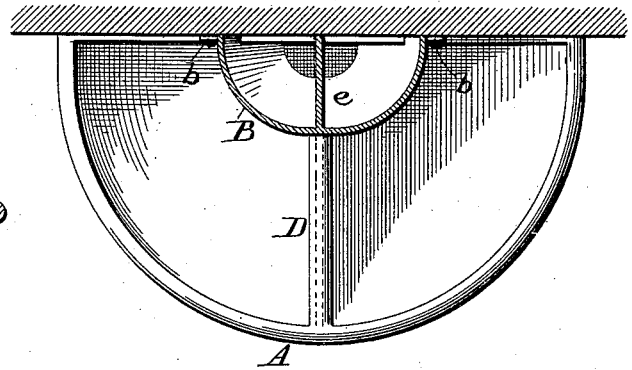
Witnesses:
James F. Duhamel
Walter S. Dodge
Inventor:
J. W. Fiske,
by Dodge & Son,
Attys

UNITED STATES PATENT OFFICE.

JOSEPH W. FISKE, OF NEW YORK, N. Y.

CHUTE FOR FEED-MANGERS.

SPECIFICATION forming part of Letters Patent No. 351,505, dated October 26, 1886.

Application filed January 7, 1886. Serial No. 187,900. (No model.)

*To all whom it may concern:*

Be it known that I, JOSEPH W. FISKE, of New York, in the county of New York and State of New York, have invented certain new and useful Improvements in Chutes for Feed-Mangers, of which the following is a specification.

My invention relates to mangers for feeding grain to horses or other animals; and the invention consists of a metallic chute for receiving the grain and delivering it gradually to the trough from which it is eaten, as hereinafter more fully set forth.

Figure 1 is a front perspective view, looking downward. Fig. 2 is a central vertical section; and Fig. 3 is a transverse section on the line *x x* of Fig. 2, showing a double chute and manger.

It is well known to horsemen that many horses and other animals, when given their grain, eat so voraciously that the grain, more or less of it, is swallowed whole or without being properly masticated. In such case the result is indigestion and failure to receive the full benefit of the grain, and it is therefore desirable to have some means by which the grain shall be delivered to the trough very slowly, so that the animal shall be forced to eat more deliberately, and thus more thoroughly crush or masticate its grain.

It is common at the present time, especially in the better class of stables, to use metallic feed-troughs, they being made of a form to fit in the angle or corner of the stall, or semicircular, to fit against the flat face of the wall, these troughs being designed simply as a receptacle for the grain, from which the animal eats it at will.

The object of my present invention is to produce a metallic grain chute or receptacle so constructed that it can be furnished separately to the public and be applied in connection with the metal or other feed-troughs already in use, and which shall be adapted to the various forms and positions of the feed-troughs in general use.

In Fig. 1, A represents a metallic feed-trough or manger as usually made for use in corners of the stall, it having two flat sides standing at right angles to each other, with a circular front. To adapt my grain-chute to such a trough or manger I construct a metal plate, B, preferably of cast-iron, of the form shown in Figs. 1 and 2—that is to say, it is much wider at the top than at the bottom, and has its sides or edges curved backward and made to fit close against the walls at each side, its lower tapering end fitting within the trough A, but not quite reaching to the bottom of the trough, thus leaving a small opening at its lower end, as shown in Fig. 2, through which the grain will work out slowly into the trough only as the little in the trough is eaten, the very small amount in the trough compelling the horse to eat it slowly. This chute B, I make of a single plate, triangular in form, nearly flat transversely, with its edges curved backward to fit against the wall or walls, and preferably with a vertical concavity along its central portion for the purpose of giving more room for the horse's head when eating, and also to render it more graceful and ornamental in appearance, as shown in Fig. 1. Of course its form may be varied more or less; but I prefer to make it as shown, and, whatever its form may be, it will be provided with ears *b*, or equivalent means for securing it in place, these ears, of course, being set at the proper angle to fit flat against the wall or walls to which it is to be secured.

The opening at the bottom for the exit of the grain will usually be regulated by the person putting up the chute by fastening it so as to leave the required space at that point between its lower end and the bottom of the trough A. When, however, these chutes are made to go with a trough of any special make, and which have bottoms of uniform shape, the chute may have its lower end more or less curved along the front, thus permitting its corners to rest on the bottom of the trough and leave an opening of the proper size, as shown in Figs. 1 and 2.

In some cases these feed-troughs A, instead of being located at the corner of the stall, are placed at the center or other point against the flat face of the wall, in which case they are made semicircular, as shown in Fig. 3. In such case the chute B will also be made semicircular, or substantially so, its front being more or less flattened or concaved, if desired, for the purpose of rendering it more ornamental, it being provided with the ears *b*, and otherwise arranged to operate the same as that already described. In some cases it is desirable, also, to use a double feed-trough—that is, a trough having a partition in its center—thus forming in effect two troughs, as shown in Fig. 3, such being designed for the use of a double team, one horse eating from one side and the other from the opposite side, such troughs being usually so located that the partitions therein will come in line with the wall or partition which separates the animals. In such case the chute B will be made with a central vertical partition, e, as shown in Fig. 3, so that each animal can secure only its proportion of the grain. This partition may be made integral with the body of the chute, or it may be made separately and then be fastened thereto. As, however, it is inside, where it cannot be reached by the animals, and cannot be seen from the exterior, it may be made of a piece of board or of sheet metal and be put in when the chute is put up. As indicated, I propose to make these chutes of cast-iron, the same as these feed-troughs are; but it is obvious that they may be made of sheet metal by using metal thick enough to keep its form and retain its position, or by using a frame of the proper shape and covering it with lighter sheet metal. Cast-iron is preferable, however, as it is strong, and when once the proper pattern or patterns are made the article can be made cheaper than by any other plan.

As shown in Figs. 1 and 2, the chute is or should be provided with a hinged lid, C, having a knob or handle to open and close it, to exclude rats or vermin of any kind, dust, &c., and prevent the animal from eating out of it.

By these means I am enabled to produce a grain-chute for use in connection with feed-troughs that is simple, efficient, and cheap, and which can be put on the market as an article of trade, so that any one having feed-troughs can buy and apply them, whenever desired, in connection with the troughs already in use.

It is of course obvious that the troughs and chutes may be manufactured and sold together, and I propose to so make them, at the same time furnishing the chutes separately to such as have the troughs already in use.

I am aware that it is not new to arrange a reservoir for holding grain to be automatically fed into a feed-trough below, both for horses and other animals; but, so far as I am aware, no one has before conceived the idea of or made a chute separate from the feed-trough, and so that it could be applied to troughs already in use, as above set forth, and therefore

What I claim is—

The herein-described grain-chute for feed-troughs, consisting of the triangular plate B, having its edges constructed to fit against the wall or walls of the stall and of the feed-trough, and having its central front portion flattened or made slightly concave, substantially as shown, whereby it is adapted for use in connection with the ordinary feed-troughs already in use.

JOSEPH W. FISKE.

Witnesses:
J. W. VANDEWATER,
J. F. MURPHY.